Patented Aug. 11, 1953

2,648,662

UNITED STATES PATENT OFFICE 2,648,662

PREPARATION OF 3,20-DIKETO-17α-HYDROXY STEROIDS

Percy L. Julian, Maywood, and Edwin W. Meyer and Isabelle Ryden, Chicago, Ill., assignors to The Glidden Company, Cleveland, Ohio, a corporation of Ohio No Drawing. Application August 4, 1949, Serial No. 108,657

16 Claims. (Cl. 260—239.55)

The present invention relates to 3,20-diketo-17α-hydroxy steroids.

Many of the cortical hormones possess a 17α-hydroxy group. These hormones have been isolated in small quantities by tedious and expensive extraction and purification methods from adrenal cortices. Synthetic methods for introducing the 17α-hydroxy group into steroid materials obtainable from other material sources have been proposed, Fuchs and Reichstein, Helv. Chem. Acta 24, 804 (1941); Hegner and Reichstein, Helv. Chem. Acta 24, 828, 1941; Sarett, J. Biol. Chem. 162, 601, (1946); Sarett, J. A. C. S. 70, 1454, 1948; but such methods as have been proposed are at best exceedingly involved and expensive.

It appeared that reduction of 16,17-oxidopregnene and pregnane compounds might lead to the introduction of the 17α-hydroxy group. However, the usual reducing treatments were found to be unsuitable. It was then found that the reduction could be effectuated by the use of lithium aluminum hydride. Reduction of 16,17-oxido-20-keto pregnenes and pregnanes with lithium aluminum hydride was found to yield the 17α-hydroxy-20-hydroxy compounds as a mixture of the C-20 epimers. Since all of the adrenal cortical hormones contain a 3-keto group and most of them contain a 20-keto group, any preparation beginning with 3,17,20-tri-hydroxy compounds must involve an oxidation of such compounds. Such an oxidation involves extensive cleavage at the $C_{17}$—$C_{20}$ bond, producing compounds related to adrenosterone. Thus, for example, Sarett, J. Biol. Chem., 162, 601 (1946), could obtain only an 18% yield of Kendall's Compound E on oxidation of Reichstein's Compound U–21-monoacetate with chromic acid. Moreover, even if the 20-keto group is present as such during the oxidation of an hydroxyl group at another position in the molecule of a 17-hydroxy steroid, the preparation becomes impractical, either because of cleavage at $C_{17}$—$C_{20}$ with reagents like chromic acid, or rearrangement of ring D to a D-homosteroid with reagents of the Oppenauer oxidation type. It therefore becomes essential to protect the $C_{20}$-keto group during such transformations in a way that allows its ready regeneration when such transformations have been effected.

It also follows from the above that it is essential to avoid transformation of the 20-keto group into a secondary alcohol group during any vigorous reduction such as that of the 16,17-oxido group.

It is accordingly an object of the present invention to provide a process for the preparation of 3,20-diketo-17α-hydroxy steroids of the pregnane and pregnene series.

A further object is to provide a method for protecting the α-ketol structure of 17α-hydroxy-20-keto pregnenes and pregnanes during oxidation of hydroxy groups elsewhere in the molecule.

An additional object is to provide a method for converting 17α-hydroxy-20-keto pregnenes and pregnanes having hydroxy groups in the 3-position into 3,20-diketo-17α-hydroxy pregnenes and pregnanes.

Another object is to provide new steroid compounds which are readily convertible to 3,20-diketo-17α-hydroxy steroid compounds.

Other objects will be apparent from the following description.

It has been found that the foregoing objects can be accomplished when the α-ketol structure is protected by conversion of the keto group to a cyclic ketal group. It has been found that when the cyclic ketal group is present, the rearrangement to the D-homo steroid upon subjection to an Oppenauer oxidation, as well as cleavage of the $C_{17}$—$C_{20}$ bond by chromic acid, is prevented. After oxidation is completed, the ketal is readily cleaved to restore the α-ketol structure.

The following examples are illustrative:

EXAMPLE 1

*Preparation of 16,17-oxido-5-pregnene-3β-ol-20-one acetate*

A solution of 3.54 grams of $\Delta^{5,16}$-pregnadiene-3β-ol-20-one acetate in 20 ml. of $CHCl_3$ was treated at ice bath temperature with a solution of 1.60 g. of bromine in 16 ml. of $CHCl_3$. The chloroform solution was then washed with water, 2% NaOH, water and dried. It was then concentrated in vacuo to a white crystalline solid. This solid was dissolved in 50 ml. of benzene and treated with 50 ml. of a benzene solution containing 56 mg. of perbenzoic acid per ml. After standing in the dark room at room temperature for 24 hours, the benzene solution was washed with 2% NaOH solution and water. The dried solution was concentrated to a white crystalline solid which was debrominated with zinc dust in ether-acetic acid solution. The ether solution was separated from zinc, washed with water, dilute sodium bicarbonate solution, water and dried. After concentration, the product, $\Delta^5$-16,17-oxido-pregnene-3β-ol-20-one acetate, was crystallized from methanol; 1.66 g., M. P. 152–155° C.

EXAMPLE 2

*The preparation of the ketal of 16,17-oxido-5-pregnene-3β-ol-20-one acetate*

A mixture of 744 mg. of the oxido compound of Example 1 and 744 mg. of ethylene glycol in 42 ml. of benzene was boiled in a flask connected to a modified Bidwell-Sterling moisture separator. After the residual moisture had separated from the reaction mixture, 50 mg. of p-toluenesulfonic acid monohydrate was added and boiling continued for three hours. The mixture was diluted with water and extracted with ether. The ether solution was washed with dilute sodium carbonate solution, water and dried. After addition of several drops of pyridine, the solvent was removed in vacuo and the solid residue crystallized from methanol. There resulted 400 mg. of white needles of the ethylene glycol ketal of 16,17-oxido - 5 - pregnene-3β-ol-20-one acetate. The purified material (crystallized from benzene-methanol) melted at 195–197°; $[\alpha]_D^{27}$ —37.8 (chloroform).

EXAMPLE 3

*Preparation of the ketal of 17α-hydroxypregnenolone*

A solution of 600 mg. of the ketal of Example 2 in 40 ml. dry ether-10 ml. benzene was added dropwise with stirring to a suspension of 300 mg. of lithium aluminum hydride in 50 ml. of dry ether. The mixture was stirred for two hours, the last hour while warming gently on a steam bath. It was then decomposed with water and extracted with ether. The solution was washed with water, dried and concentrated in vacuo after the addition of a drop of pyridine. The remaining solid when crystallized from acetone gave white mealy crystals melting at 178–181°. By recrystallization from acetone, the pure ethylene glycol ketal of 17α-hydroxypregnenolone, M. P. 185–187°, was obtained $[\alpha]_D^{26}$—44.8° (chloroform).

EXAMPLE 4

*The preparation of 17α-hydroxy progesterone*

A solution of 480 mg. of 17α-hydroxypregnenolone ketal in 35 ml. of toluene and 5 ml. of cyclohexanone was distilled until the distillate came over clear. The condenser was then changed to reflux and 5 ml. of dry toluene was added. Two and one-half ml. of a solution of 1.0 g. of aluminum isopropylate in 10 ml. of dry toluene was dropped in. The mixture was allowed to reflux for one-half hour, cooled, diluted with ether and washed with 5% NaOH to remove aluminum salts. The ether extract was washed with water to neutrality, concentrated to remove most of the ether and steam distilled for one hour. Two grams of sodium chloride was added and the crystalline solid which separated on cooling was filtered, washed with water, and air-dried.

The product at this point consisted of a mixture (M. P. 165–195°) containing 17α-hydroxy progesterone ketal and a small amount of 17α-hydroxyprogesterone. A small amount was recrystallized several times from methanol to give fine plates melting 212°–216° which had the correct analysis for 17α-hydroxy progesterone ketal. Calculated for $C_{23}H_{34}O_4$: C=73.76; H=9.15. Found: C=73.76; H=9.02.

A solution of 360 mg. of the crude ketal in 20 ml. of methanol was clarified by filtration and .4 ml. of sulfuric acid in 4 ml. of water was added. The mixture was refluxed for one-half hour, poured into water, extracted with ether, washed with sodium bicarbonate solution and water until neutral, dried over sodium sulfate and concentrated in vacuo. Crystallization of the residue from acetone gave 120 mg. of 17α-hydroxyprogesterone melting 204°–208°. The acetone was removed from the mother liquors in vacuo and a second crop of 30 mg. melting 200°–205° was obtained by crystallization from ether-petroleum ether. An analytical sample prepared by several recrystallizations from acetone consisted of diamond-shaped plates melting 213°–215°. $[\alpha]_D^{22°}$ = +97°±2° (in chloroform). Calculated for $C_{21}H_{30}O_3$: C=76.32; H=9.15. Found: C=76.07; H=9.05. Natural 17α-hydroxyprogesterone as isolated from the adrenal glands by Pfiffner and North [J. Biol. Chem 132, 459, (1940)] melts 212°–215°. $[\alpha]_D^{27}$=+102°±3° (in chloroform).

EXAMPLE 5

*The preparation of the ketal of 16,17-oxido-allopregnane-3β-ol-20-one acetate*

A mixture of 1.32 g. of 16,17-oxido-allopregnane-3β-ol-20-one acetate and 1.31 g. of ethylene glycol in 50 ml. of benzene containing 50 mg. of p-toluenesulfonic acid monohydrate was refluxed in a flask connected to a Bidwell-Sterling moisture separator. After three hours the solution was diluted with ether, washed with water, dilute sodium carbonate solution, water and dried. The solvent was removed in vacuo and the residue was crystallized from acetone containing a few drops of pyridine. There resulted white, needle-like crystals of the ethylene glycol ketal of 16,17-oxido-allopregnane-3β-ol-20-one acetate, M. P. 188–192°. Treatment of the ketal of the 16,17-oxido compound with lithium aluminum hydride and working up as in Example 3 yields the cyclic ketal of allopregnane-3β,17α-diol-20-one, which upon acid hydrolysis is converted to the 17α-hydroxy-allopregnanolone.

EXAMPLE 6

*Preparation of ketal of 17α-hydroxy pregnenolone*

Fifteen parts of ethylene glycol and 17α-hydroxy pregnenolone by weight in benzene was boiled to remove the last traces of moisture, and one part of p-toluenesulfonic acid monohydrate was then added and the boiling continued for 3 hours. The solution was then diluted with water and extracted with ether. The ether solution was then washed with dilute sodium carbonate solution, water and dried, and the ether removed in vacuo. The thus formed 20-ethylene ketal of 17α-hydroxy pregnelone may then be treated as in Example 4.

EXAMPLE 7

*Preparation of allopregnane 17α-ol-3,20-dione*

A mixture of 1.32 g. of 16,17-oxido-allopregnane-3β-ol-20-one acetate and 1.31 g. of ethylene glycol in 50 ml. of benzene containing 50 mg. of p-toluenesulfonic acid monohydrate was refluxed in a flask connected to a Bidwell-Sterling moisture separator. After three hours the solution was diluted with ether, washed with water, dilute sodium carbonate solution, water and dried. The solvent was removed in vacuo and the residue was crystallized from acetone containing a few drops of pyridine. There resulted white, needle-like crystals of the ethylene glycol ketal of 16,17-oxido-allopregnane-3β-ol-20-one acetate, M. P. 188–192°. Treatment of the ketal of the 16,17-oxido compound with lithium aluminum hydride and working up as in Example 3 yields the cyclic ketal of allopregnane-3β,17α-diol-20-one. The 20-ethylene ketal of the allopregnane-3β,17α-diol-20-one was then subjected to an Oppenauer oxidation as in Example 4. The oxidation mixture may then be worked up and upon hydrolysis of the crude ketal as in Example 4 there is obtained the allopregnane-17α-ol-3,20-dione.

EXAMPLE 8

*Preparation of 17α-hydroxy progesterone*

To a solution of the 20-ethylene ketal of 17α-hydroxy pregnenolone in toluene there was slowly added an equimolecular quantity of $Br_2$ in a small amount of toluene. This solution was then treated with a solution of chromic acid in acetic acid and the dibromo ketone was then debrominated employing zinc dust in acetic acid. Upon hydrolysis of the debrominated compound, the 17α-hydroxy progesterone of Example 4 is obtained.

It will be understood that various modifications may be made in the foregoing examples without department from the invention. Thus, other ketones and catalysts may be employed when carrying out the Oppenauer oxidation, as is well known in the art. By "Oppenauer oxidation" is meant the conversion of a hydroxy group to a keto group by treatment of the steroid with aluminum alkoxide in the presence of an excess of ketone.

It will be readily seen from the foregoing that a means is provided for protection of the 20-keto group during oxidation of the 3-hydroxy group to a keto group. The invention, moreover, is not limited to the treatment of the particular compounds enumerated, but is applicable to the oxidation of compounds containing the—OH groups in positions other than the 3-position.

Also other aryl sulfonic acid catalysts than paratoluene sulfonic acid may be used. Any other suitable method for making the cyclic ketal may be used, however. Other glycols than ethylene glycol may also be employed. Thus, propylene glycol, trimethylene glycol, and the like, may be used, but preferably the hydroxyl groups should be 1, 2 or 1,3 to each other.

Attention is directed to application Serial No. 93,638, filed May 16, 1949, relating to the reduction of 16,17-oxido-20-keto steroids with lithium aluminum hydride, and to application Serial No. 108,653, filed August 4, 1949, relating to the 16,17-oxido-20-cyclic ketals, their reduction with lithium aluminum hydride, and the reduction products, claiming subject matter herein disclosed but not claimed.

Having described the invention, what is claimed is:

1. The process of treating a 3-hydroxy-17α-hydroxy - 17 - acetyl - 10,13 - dimethylcyclopentanopolyhydrophenanthrene with a glycol to form a 20-cyclic alkylene ketal derivative of the starting material, oxidizing the 3-hydroxy group of the resulting ketal compound to a keto group, then hydrolyzing the ketal group of the resulting 3-keto compound in the presence of acid, and separating the resulting 3-keto-17α-hydroxy - 17 - acetyl - 10,13 - dimethylcyclopentanopolyhydrophenanthrene.

2. The process of claim 1 in which the glycol is ethylene glycol.

3. The process of claim 1 in which the cyclopentanopolyhydrophenanthrene is a $\Delta^5$ compound.

4. The process of claim 1 in which the oxidation is an Oppenauer oxidation.

5. The process of claim 1 in which the steroid compound is unsaturated, the oxidation is a chromic acid oxidation, and the double bond is protected during the oxidation by saturation with bromine.

6. The process which comprises subjecting a 20-cyclic ketal of a 3-hydroxy-17α-hydroxy-17-acetyl - 10,13 - dimethylcyclopentanopolyhydrophenanthrene to an oxidizing treatment to convert the 3-hydroxy group to a ketone group.

7. The process which comprises subjecting the 20-cyclic ethylene ketal of $\Delta^5$-pregnene-3β,17α-diol-20-one to an Oppenauer oxidation and hydrolyzing the resulting 3-keto compound to form 17α-hydroxyprogesterone.

8. The 20-cyclic lower alkylene ketals of 3-keto-17α-hydroxy-17-acetyl-10,13-dimethylcyclopentanopolyhydrophenanthrenes.

9. The 20-cyclic ethylene ketals of 3-keto-17α-hydroxy - 17 - acetyl - 10,13 - dimethylcyclopentanopolyhydrophenanthrenes.

10. The 20-cyclic ethylene ketal of $\Delta^4$-pregnene-17α-ol-3,20-dione.

11. The 20-cyclic lower alkylene ketals of 3-keto-17α-hydroxy-20-keto-pregnanes.

12. The 20-cyclic lower alkylene ketals of 3-keto-17α-hydroxy-20-keto-$\Delta^4$-pregnenes.

13. The process which comprises oxidizing the 3-OH group of a cyclic ketal of a 3-hydroxy-17α-hydroxy - 17 - acetyl - 10,13 - dimethylcyclopentanopolyhydrophenanthrene in which the ketal ring contains more than 2 and less than 5 carbon atoms with an oxidizing agent capable of converting the 3-OH to a keto group to convert the 3-OH group of the cyclic ketal to a keto group, and subjecting the resulting compound to an acid hydrolysis to form a ketal group at the 17,20-positions.

14. The 20-cyclic ketals of 3-keto-17α-hydroxy - 17 - acetyl - 10,13 - dimethylcyclopentanopolyhydrophenanthrenes in which the ring of the cyclic ketal structure contains more than 2 and less than 5 carbon atoms.

15. The 20-cyclic lower alkylene ketals of 17α-hydroxy-allopregnane-3,20-dione.

16. The compounds of claim 15 in which the alkylene group is an ethylene group.

PERCY L. JULIAN.
EDWIN W. MEYER.
ISABELLE RYDEN.

References Cited in the file of this patent

UNITED STATES PATENTS

| Number | Name | Date |
|---|---|---|
| 2,288,854 | Stavely | July 7, 1942 |
| 2,302,636 | Koster | Nov. 17, 1942 |
| 2,312,482 | Reichstein | Mar. 2, 1943 |
| 2,356,154 | Fernholz | Aug. 22, 1944 |

OTHER REFERENCES

"Newer Methods of Preparative Organic Chemistry," Interscience Publishers, Inc., New York, N. Y., pp. 143–158 (1948).